(12) United States Patent
Yeo

(10) Patent No.: US 9,632,280 B2
(45) Date of Patent: Apr. 25, 2017

(54) LENS ACTUATOR HAVING AUTOFOCUS FUNCTION AND HAND-SHAKE CORRECTION FUNCTION

(71) Applicant: LG INNOTEK CO., LTD., Seoul (KR)

(72) Inventor: In Jae Yeo, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 14/771,683

(22) PCT Filed: Mar. 14, 2014

(86) PCT No.: PCT/KR2014/002203
§ 371 (c)(1),
(2) Date: Aug. 31, 2015

(87) PCT Pub. No.: WO2014/142622
PCT Pub. Date: Sep. 18, 2014

(65) Prior Publication Data
US 2016/0018624 A1    Jan. 21, 2016

(30) Foreign Application Priority Data

Mar. 14, 2013    (KR) .................. 10-2013-0027069

(51) Int. Cl.
*G02B 27/64*    (2006.01)
*G02B 7/10*    (2006.01)
(Continued)

(52) U.S. Cl.
CPC ............... *G02B 7/102* (2013.01); *G02B 7/08* (2013.01); *G02B 27/646* (2013.01); *G03B 3/10* (2013.01);
(Continued)

(58) Field of Classification Search
CPC ................ G02B 27/64; G02B 27/646; G03B 2205/0007; G03B 2205/0015;
(Continued)

(56) References Cited

U.S. PATENT DOCUMENTS

2012/0314307 A1* 12/2012 Ikushima ............... G02B 7/08
                                                            359/814
2012/0314308 A1    12/2012 Ikushima et al.

FOREIGN PATENT DOCUMENTS

JP    2012173713 A    9/2012
KR    100782793 B1    12/2007

OTHER PUBLICATIONS

International Search Report in International Application No. PCT/KR2014/002203 filed Mar. 14, 2014.

\* cited by examiner

*Primary Examiner* — Arnel C Lavarias
(74) *Attorney, Agent, or Firm* — Saliwanchik, Lloyd & Eisenschenk

(57) ABSTRACT

A lens actuator, according to the present invention, includes: a carrier in which a lens is accommodated, and which has a plurality of first sides; magnets including first magnets respectively arranged on the outer side of the plurality of first sides of the carrier, and second magnets arranged to be spaced from the first magnets; a housing having a plurality of second sides facing the first sides; a plurality of correction coils formed at positions corresponding to the first and second magnets; and a gap-adjusting coil arranged on the lower part of the first magnets.

20 Claims, 9 Drawing Sheets

(51) Int. Cl.
    *G03B 5/00*         (2006.01)
    *G02B 7/08*         (2006.01)
    *G03B 3/10*         (2006.01)
    *H04N 5/232*       (2006.01)

(52) U.S. Cl.
    CPC ........ *G03B 5/00* (2013.01); *G03B 2205/0007* (2013.01); *G03B 2205/0069* (2013.01); *H04N 5/23287* (2013.01)

(58) Field of Classification Search
    CPC ...... G03B 2205/0023; G03B 2205/003; G03B 2205/0038; G03B 2205/0053; G03B 2205/0061; G03B 2205/0069; G03B 2205/0076; G03B 2205/0084; H04N 5/23248; H04N 5/23264; H04N 5/2328; H04N 5/23283; H04N 5/23287
    USPC ...... 359/554, 555, 556, 557; 396/52, 53, 54, 396/55, 12, 13; 348/208.99, 208.4, 208.5, 348/208.6, 208.7, 208.8, 208.11
    See application file for complete search history.

LENS ACTUATOR HAVING AUTOFOCUS FUNCTION AND HAND-SHAKE CORRECTION FUNCTION

CROSS-REFERENCE TO RELATED APPLICATIONS

This application is the U.S. national stage application of International Patent Application No. PCT/KR2014/002203, filed Mar. 14, 2014, which claims priority to Korean Application No. 10-2013-0027069, filed Mar. 14, 2013, the disclosures of which are incorporated herein by reference in their entirety.

BACKGROUND OF THE DISCLOSURE

Technical Field

The teachings in accordance with the exemplary embodiments of this present disclosure generally relate to a lens actuator.

Background

Small-sized camera modules configured to photograph digital images and/or videos are recently being incorporated into a variety of host devices. The small-sized camera module includes an image sensor configured to generate a digital image corresponding to an outside light by receiving the outside light and a lens arranged at a front side of the image sensor, and a lens actuator configured to drive the lens.

The small camera module is added with an autofocus function configured to adjust a focus by adjusting a gap between a lens and an image sensor, whereby a high quality image can be obtained. However, the small camera modules largely used for portable devices are added with a hand-shake correction scheme compensating an image instability caused by camera shake, that is, vibration of a camera apparatus typically caused by user hand, in addition to auto-focusing automatically adjusting an image focus.

The conventional small camera module has suffered from disadvantages of complicated configuration, voluminous size and frequent generation of defects in the course of assembly due to inclusion of an autofocus unit including a magnet and a coil for performing the autofocus function and a hand-shake correction unit including a magnet and coils for performing hand-shake correction function by being arranged at an outside of the autofocus unit.

Furthermore, the conventional small camera module has also suffered from disadvantages of a large consumption of power due to realization of an autofocus function and a hand-shake correction function, each function using separate coils by an autofocus unit and a hand-shake correction unit.

BRIEF SUMMARY

The present disclosure has been made to solve the foregoing disadvantages/problems of the prior art and therefore an object of certain embodiments of the present disclosure is to provide a lens actuator configured to simplify the configuration by reducing the number of parts and decreasing the size and defects during assembly and to reduce the power consumption at the same time.

Technical problems to be solved by the present disclosure are not restricted to the above-mentioned description, and any other technical problems not mentioned so far will be clearly appreciated from the following description by the skilled in the art.

The present disclosure is to solve at least one or more of the above problems and/or disadvantages in whole or in part and to provide at least advantages described hereinafter. In order to achieve at least the above objects, in whole or in part, and in accordance with the purposes of the present disclosure, as embodied and broadly described, and in one general aspect of the present invention, there is provided a lens actuator, the lens actuator comprising:

a carrier accommodated by a lens and formed with a plurality of first lateral surfaces;

a magnet including a first magnet arranged at an outside of the plurality of first lateral surfaces of the carrier, and a second magnet discretely arranged from the first magnet;

a housing formed with a plurality of second lateral surfaces opposite to the first lateral surfaces;

a plurality of shim coils formed at a position corresponding to that of the first and second magnets; and a gap adjusting coil arranged at a bottom surface of the first magnet.

Preferably, but not necessarily, the first lateral surfaces of the carrier may be formed with first and second reception grooves to accommodate the first and second magnets.

Preferably, but not necessarily, a length of the second magnet to an optical axis may be longer than that of the first magnet.

Preferably, but not necessarily, each of the magnets may be arranged at a corner portion by being discrete from a center of the first lateral surfaces.

Preferably, but not necessarily, the gap adjusting coil may be formed therein with an opening, and formed along an edge of a bottom surface of the carrier.

Preferably, but not necessarily, an outside surface of the first and second magnets may be formed with a flat surface, and a part of an inner lateral surface may include a slope.

Preferably, but not necessarily, the second lateral surface may be formed with a through hole to expose the shim coil, and the through hole may be formed at a periphery thereof with a breakaway prevention unit to prevent the shim coil from breaking away.

Preferably, but not necessarily, the lens actuator may further comprise a leaf spring arranged at an upper surface and a bottom surface of the housing to support an upper surface and a bottom surface of the carrier.

Preferably, but not necessarily, a coupling protruder coupled to the leaf spring may be formed at the upper surface and the bottom surface of the carrier.

Preferably, but not necessarily, the leaf spring may include an inner leaf spring unit coupled to the carrier, an outer leaf spring unit discretely formed from the inner leaf spring unit to be coupled to the housing, and a connection unit connecting the inner leaf spring unit and the outer leaf spring unit.

Preferably, but not necessarily, the connection unit may include a straight line-shaped first connection unit connected to the outer leaf spring unit, and a straight line-shaped second connection unit connected to the first connection unit and connected to the inner leaf spring unit.

Preferably, but not necessarily, the lens actuator may further comprise a base unit accommodated by the gap adjusting coil.

Preferably, but not necessarily, the base unit may be formed with an opening formed at an area corresponding to that of the lens and with a ring-shaped groove arranged at a periphery of the opening to accommodate the gap adjusting coil.

Preferably, but not necessarily, an area corresponding to that of the shim coil on an upper surface of the base unit may be formed with an escape groove.

Preferably, but not necessarily, the lens actuator may further comprise a circuit substrate formed with an opening to expose the gap adjusting coil.

Preferably, but not necessarily, the circuit substrate may include a first terminal electrically connected to the gap adjusting coil and a second terminal electrically connected to the shim coil.

Preferably, but not necessarily, the lens actuator may further comprise a cover can configured to wrap the gap adjusting coil and the shim coil.

The lens actuator according to the exemplary embodiments of the present disclosure has an advantageous effect in that magnets are adjacently arranged near a gap adjusting coil for performing an autofocusing function and a shim coil for performing a handshake correction function to allow performing the autofocusing function and the handshake correction function using one magnet, whereby the number of parts, volume and the number of assembly processes can be reduced, and consumption power necessary for performing the autofocusing function and the handshake correction function can be greatly reduced as well.

BRIEF DESCRIPTION OF THE DRAWINGS

The accompanying drawings included to provide a further understanding of the disclosure and incorporated in and constituted as a part of this application, illustrate embodiment(s) of the disclosure, and together with the description, serve to explain the principle of the disclosure. In the drawings.

DETAILED DESCRIPTION

Various exemplary embodiments will be described more fully hereinafter with reference to the accompanying drawings, in which some exemplary embodiments are shown.

In describing the present disclosure, certain layers, sizes, shapes, components or features may be exaggerated for clarity and convenience. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
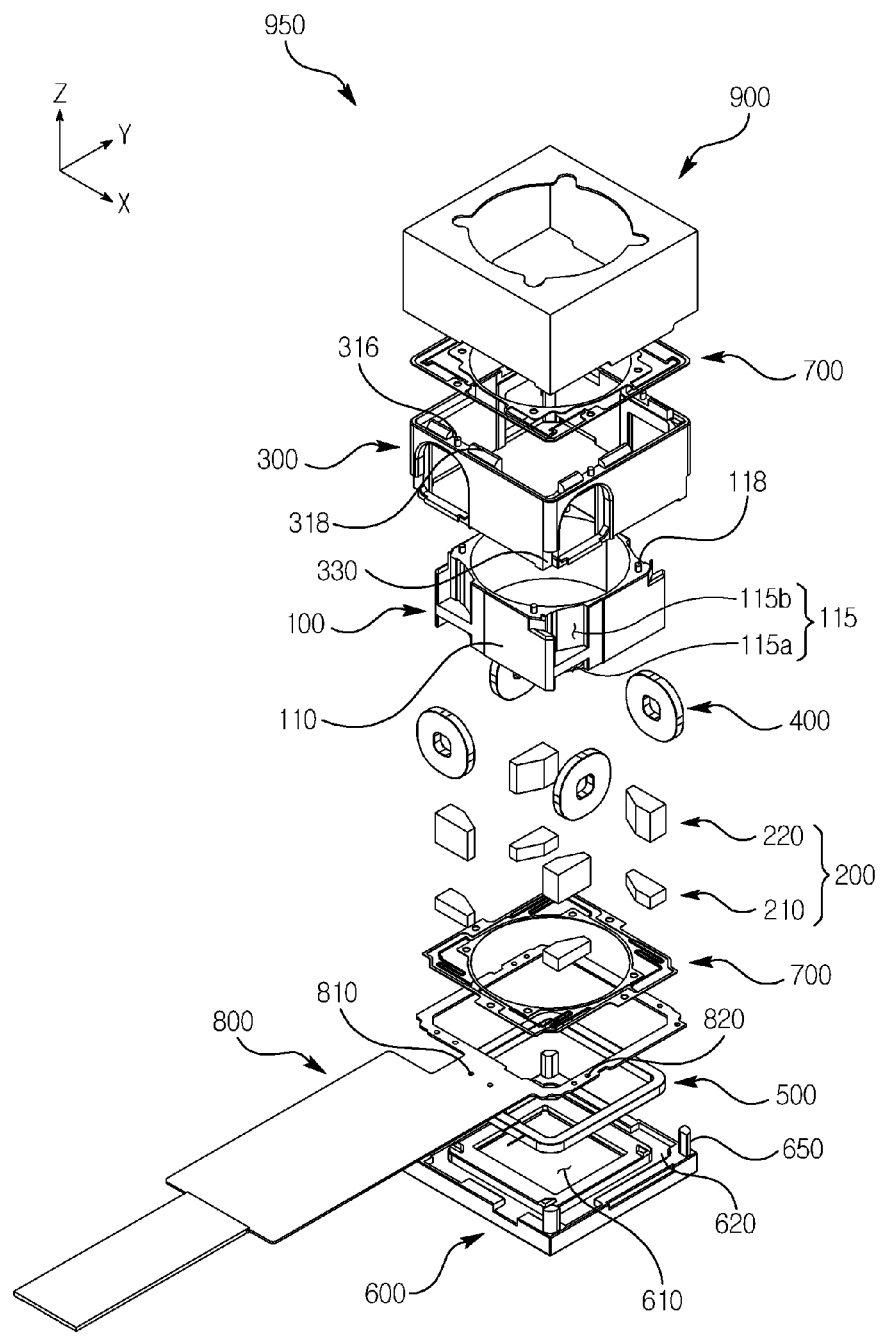
FIG. 1 is an exploded perspective view illustrating a lens actuator according to an exemplary embodiment of the present disclosure.
Figure 2:
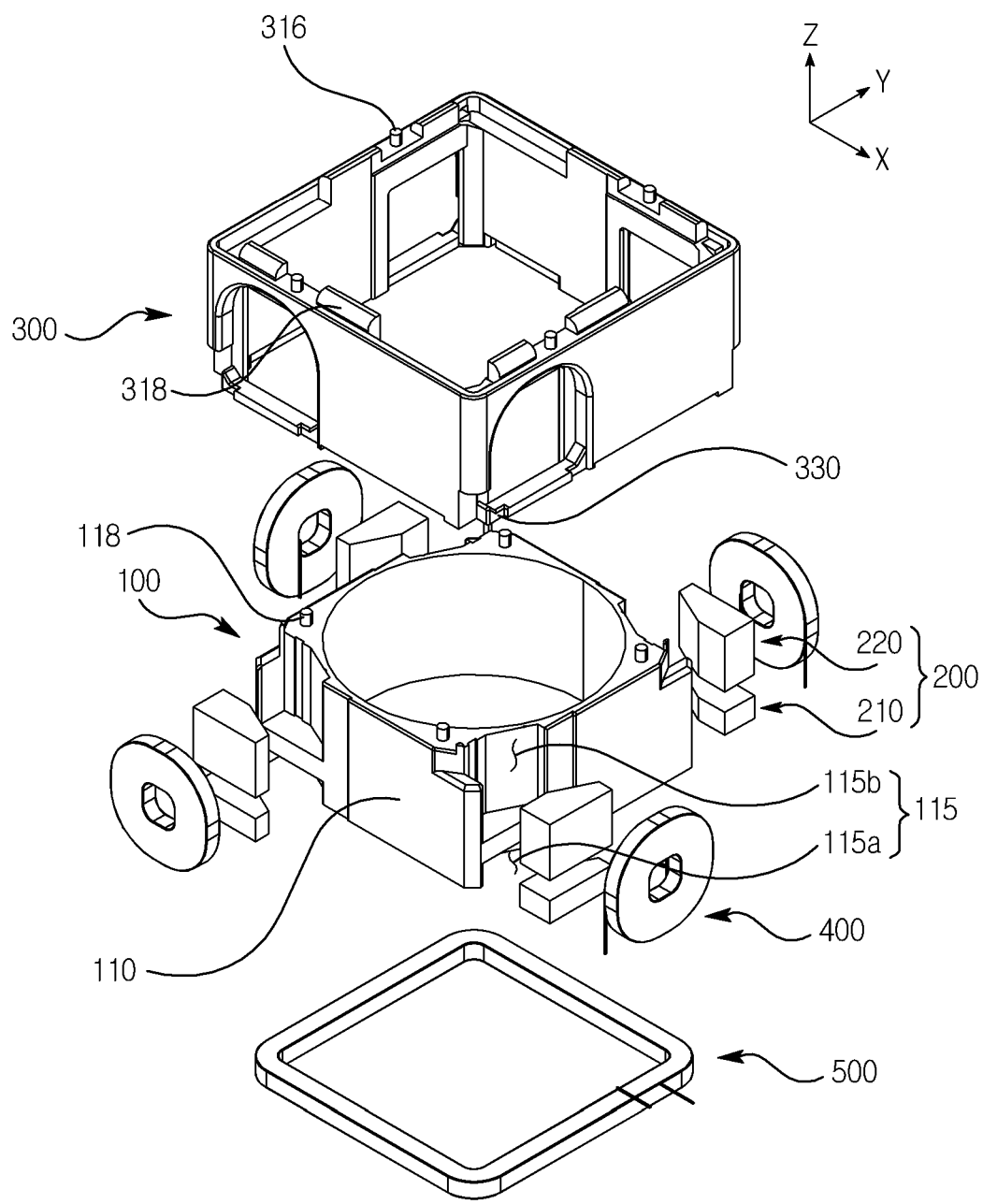
FIG. 2 is an extracted enlarged perspective view of a carrier, a housing and a gap adjusting coil of a lens actuator of FIG. 1.
Figure 3:
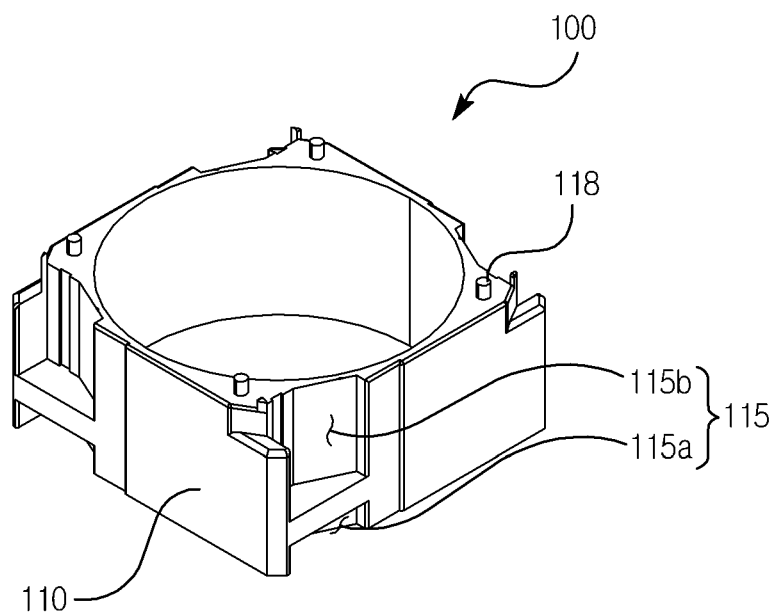
FIG. 3 is an extracted perspective view illustrating a carrier of FIG. 1.

FIG. 1 is an exploded perspective view illustrating a lens actuator according to an exemplary embodiment of the present disclosure, FIG. 2 is an extracted enlarged perspective view of a carrier, a housing and a gap adjusting coil of a lens actuator of FIG. 1, and FIG. 3 is an extracted perspective view illustrating a carrier of FIG. 1.

Referring to FIGS. 1 to 3, a lens actuator (950) may include a carrier (100), a magnet (200), a housing (300), a first coil (400) and a second coil (500).

The carrier (100) may be formed by injection molding process using, for example, a synthetic resin. However, the present disclosure is not limited thereto. The carrier (100) may take a form of upper/bottom surfaces-opened square cylindrical shape. However, the present disclosure is not limited thereto, and the carrier (100) may be formed by taking various shapes.

In the present exemplary embodiment, the carrier (100) may take a form of upper/bottom surfaces-opened square cylindrical shape, with an inner surface taking a circular shape. Thus, the carrier (100) may have four flat first lateral surfaces (110). In the present exemplary embodiment, each inner angle of four first lateral surfaces (110) may be formed at a right angle. The inner surfaces of the carrier (100) may be formed with a curved surface to accommodate and fix a lens. The first lateral surfaces (110) of the carrier (100) may be formed with reception grooves (115) to fix a magnet (described later).

Each first lateral surface (110) may be formed with two (2) reception grooves (115), such that a total of eight (8) reception grooves (115) may be formed on four (4) first lateral surfaces (110). However, the present disclosure is not limited thereto and it should be apparent that an appropriate number of reception grooves may be formed. For example, a total of four (4) reception grooves may be formed or an even number of reception grooves may be formed.

Hereinafter, the reception grooves (115) formed on the first lateral surface (110) may include a first reception groove (115a) and/or a second reception groove (115b). The first reception groove (115a) may be fixed by a magnet (described later and the second reception groove (115b) may be arranged with a second magnet (described later).

Two first and second reception grooves (115a, 115b) formed at each first lateral surface (110) may be formed along a Z axis as shown in FIG. 1, and the first reception groove (115a) may be formed with a first length to an optical direction of light passing through a lens, and the second reception groove (115b) may be formed with a second length to an optical direction of light passing through the second reception groove (115b).

In the present exemplary embodiment, the first and second reception grooves (115a, 115b) may be discretely formed each at a predetermined distance to the optical axis. For example, the first and second reception grooves (115a, 115b) may be discretely formed, two for each first lateral surface (110), may be formed adjacent to a corner formed by meeting of a pair of adjacent first lateral surfaces. Alternatively, the reception groove (115) may be formed at a center or near the center of the first lateral surface (110).

The first and/or second reception grooves (115a, 115b) formed at each first lateral surface (110) may be formed at an equal interval, and the first and/or second reception grooves (115a, 115b) formed at each first lateral surface (110) may be arranged to a diagonal direction. The first reception groove (115a) may be formed at a first length based on an optical axis direction which is an advancing direction of light passing through the lens, and the second reception groove (115b) may be formed at a second length longer than the first length based on the optical axis direction which is an advancing direction of light passing through the lens.

The carrier (100) may be protrusively formed at an upper surface and a bottom surface with a plurality of protruders (118) to be protruded from the upper surface and the bottom surface of the carrier (100). However, although the exemplary embodiment has explained that the protruders are protruded from the upper surface and the bottom surface, the protruders may be protruded from any one of the upper surface and the bottom surface.

Each of the protruders (118) formed at the carrier (110) may fix elastic members (described later). The plurality of protruders (118) may be respectively formed at an upper corner or a bottom corner where the pair of first lateral surfaces joins, but may also be formed at a center or a vicinity of the center.

A magnet (200) may be arranged at reception grooves (115) including the first and second reception grooves (115a, 115b) formed at the first lateral surface (110) of the carrier (100). The magnet (200) may include a first magnet (210) and a second magnet (220), and the number of magnets may be changed subject to the changing number of reception grooves.

The first magnet (210) may take a shape similar to that of a cube, and a portion of a lateral surface at the first magnet (210) inserted into the first reception groove (115a) formed at the first lateral surface (110) may be formed in the flat surface shape, and a balance of the lateral surface may be formed with a slope. Furthermore, the other surface opposite to the partial (portion) lateral surface of the first magnet (210) may be formed with a flat surface. The reason of forming, in the shape of a slope, the partial portion of the lateral surface inserted into the first reception groove (115a) in the first magnet (210) is to prevent inner surfaces of the first magnet (210) and the carrier (100) from interfering each other.

Furthermore, in another exemplary embodiment, when the first magnet (210) is arranged at the center or a vicinity of the center of the first lateral surface (110), the first magnet (210) may take a shape of a rectangular pillar.

In an exemplary embodiment of the present disclosure, the first magnet (210) may be formed with a first length inserted into the first reception groove (115a) based on an optical axis of light passing through the lens, where the first length may be approximately 400 μm~1,000 μm.

The first magnet (210) may be comprised of four pieces because the first magnet (210) is coupled to the first reception groove (115a) formed at the carrier (100). However, the present disclosure is not limited thereto, and the first magnet (210) may be formed with a few numbers of pieces, and may be formed with a greater number of pieces subject to the increasing number of reception grooves. Furthermore, the first magnet (210) may be formed with two pieces, four pieces or eight pieces, and the first magnets may be symmetrically or asymmetrically formed about the optical axis.

The second magnet (220) take a shape similar to that of a cube or take a same shape as that of the cube, and may be arranged at the second reception groove (115b) formed at the first lateral surface (110) of the second magnet (220). That is, the second magnet (220) may be arranged to Z axis direction parallel with the optical axis of light passing the lens relative to the first magnet (210). Furthermore, the second magnet (220) may be spaced apart from a bottom surface of the first magnet (210) at a predetermined distance or may contact the first magnet (210).

A portion of a lateral surface at the second magnet (220) inserted into the second reception groove (115b) may be formed in the flat surface shape, and a balance of the lateral surface may be formed with a slope. Furthermore, the other surface opposite to the partial (portion) lateral surface of the second magnet (220) may be formed with a flat surface. Furthermore, the second magnet (220) may be formed with a flat surface without slope or may take a shape of a rectangular pillar.

The first magnet (210) and the second magnet (220) may be formed in one magnet instead of being separately arranged or may be integrally formed. In the exemplary embodiment, a gap between the first and second magnets (210, 220) may be approximately 200 μm~1,000 μm. Each of the second magnets (220) may take a shape resembling that of the first magnet (210). The second magnet (220) may be formed with a second length longer than the first length of the first magnet (210) based on an optical axis of light passing through the lens, where the second length of the second magnet (220) may be approximately 1,000 μm~2,000 μm.

Figure 4:
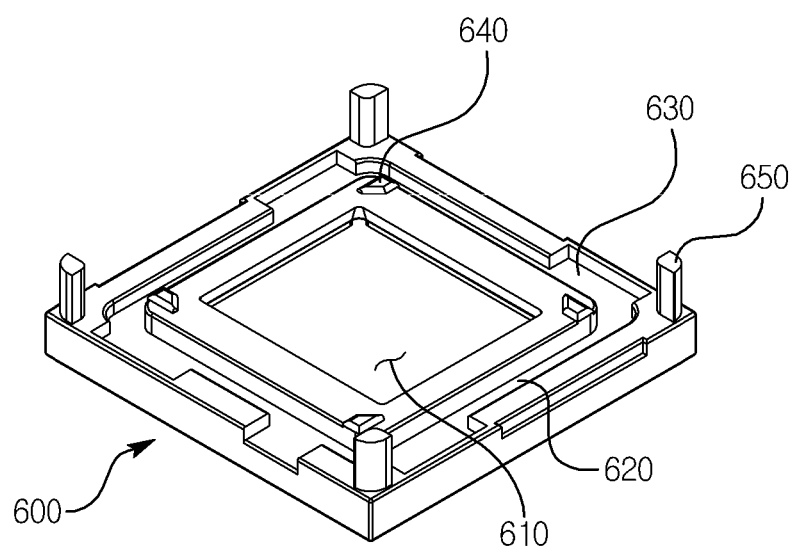
FIG. 4 is an extracted perspective view illustrating a housing of FIG. 1.

FIG. 4 is an extracted perspective view illustrating a housing of FIG. 1.

Referring to FIGS. 1 to 4, the housing (300) may take a form of upper/bottom surfaces-opened square cylindrical shape. However, the present disclosure is not limited thereto, and may take various forms in consideration of the shape of carrier (100). The housing (300) may include second lateral surfaces (310) each opposite to the first lateral surface (110) of the carrier (100). The housing (300) may be fixed to a base (described later) when the carrier (100) is received by the housing (300) including the second lateral surface (310). A staircase (315) or a protruder may be formed at an inner surface of upper and bottom surfaces of the second lateral surface (310) of the housing (300. The staircase (315) or the protruder of the housing (300) may be inserted into or arranged at the elastic member (described later), and the staircase may be formed with a protrude (316) fixing the elastic member and a pair of guide protruders (318) arranged across the protruders (316). The guide protruders (318) may function to guide an external side of the elastic member (described later). Through holes (320) or grooves may be formed at a position opposite to the magnet (200) including the first and second magnets (210, 220) fixed at the carrier (100) at the second lateral surface (310) of the housing (300). The through holes or the grooves may be arranged with a shim coil (described later).

An inner lateral surface of the second lateral surface (310) of the housing (300) may be additionally formed with a breakaway prevention unit (313) to prevent the shim coil from breaking away after being coupled by protruding from a periphery of the through hole (320) to an inside of the through hole (320).

Meantime, the second lateral surface (310) may be formed with a coil fixing unit (314) for fixing both distal ends of the shim coil and discharging the both distal ends of the shim coil to outside of the housing after the shim coil is fixed to the second lateral surface by the breakaway prevention unit (313). Although the coil fixing unit (314) may fix both distal ends of the shim coil (400) by being formed in a clip shape at a lower end of the second lateral surface (310), the present disclosure is not limited in terms of the shape of the coil fixing unit (314), and the coil fixing unit (314) may take various shapes.

A lower end corner of the second lateral surface (310) may be formed with concave coupling grooves (330), where the coupling grooves (330) may be coupled to a coupling pillar of base unit (described later). Furthermore, a coupling protrude may be formed at the lower end of the second lateral surface (310) instead of the coupling grooves (330), or conversely, a groove part may be formed at the base.

In the exemplary embodiment of the present disclosure, the through holes (320) each formed at four second lateral surfaces of the housing (300) may be formed at a position near to the corners of a pair of second lateral surfaces (310) away from a center of the second lateral surface (310), for example, and each through hole (320) may be arranged at a predetermined equal space. That is, the through holes (320) each formed at the second lateral surface (310) of the housing (300) may be so arranged as not to face each other. Furthermore, the through holes (320) or the grooves may be formed at a position opposite to the magnet.

The shim coil (400) may be formed by winding a long wire that is insulated by insulation resin, and may take a shape having a minor diameter and an external diameter. The shim coil (400) may take a doughnut shape formed with an outer lateral surface and an inner lateral surface, and the doughnut-shaped shim coil may be formed at a center with an opening. The present disclosure is not limited thereto, and the shim coil may take various shapes.

In the exemplary embodiment of the present disclosure, the shim coil (400) may correct the shake of the carrier (100) by horizontally shifting, moving or tilting the shim coil (400). Alternatively, the shim coil (400) may function to move the carrier (100) from an upper surface of the base unit based on the upper surface of the base unit.

The shim coil (400) may be fixed to the second lateral surface (310) of the housing (300), and the shim coil (400) may be arranged at the second lateral surface (310) with through holes (320) or the grooves. The shim coil (400) may be fixed by being hitched on the breakaway prevention unit (313) formed at the second lateral surface (310).

Furthermore, the shim coil (400) is coupled at both distal ends to the coil fixing unit (314) formed at the second lateral surface (310), and the both distal ends of the shim coil (400) coupled to the coil fixing unit (314) may be protruded from a bottom surface of the housing (300).

Hereinafter, each of the shim coils (400), each arranged at four second lateral surfaces may include a first shim coil unit (410), a second shim coil unit (420), a third shim coil unit (430) and a fourth shim coil unit (440).

In the exemplary embodiment of the present disclosure, the magnetic force generated from the magnet (200) including the first and second magnets (210, 220) may be aligned at the center of the electrostatic force generated from the shim coil (400). Thus, when a current is applied to the shim coil (400), the carrier (100) can be shifted or tilted to correct the handshake by the magnetic field generated from the magnet (300) coupled to the carrier (100) and the electrostatic force generated from the shim coil (400).

The gap adjusting coil (500) may be formed by winding a long wire insulated by insulation resin in a shape formed with an opening therein, for example. The thickness of the gap adjusting coil (500) may be about 200 μm~500 μm. In the exemplary embodiment of the present disclosure, the gap adjusting coil (500) may be wound to a same direction.

In the exemplary embodiment of the present disclosure, the gap adjusting coil (500) may adjust a gap formed between an upper surface of the base unit (described later) and a bottom surface of the carrier (100), and the gap adjusting coil (500) can move the carrier (100) to an optical axis direction of light passing through a lens based on the base unit.

The gap adjusting coil (500) may be arranged along an edge of the bottom surface of the carrier (100), and the gap adjusting coil (500) can pass the first magnets (210) of each magnet (200) fixed at the carrier (100), where the first magnets (210) may be so arranged as to face the gap adjusting coil (500).

Furthermore, the gap adjusting coil (500) may be so arranged as to face the magnet at a predetermined distance, and may be arranged at an upper surface of the base unit. The gap adjusting coil (500) is a complementary coil for AF (Auto Focusing) driving capable of adjusting the carrier to an optical axis direction, such that the gap adjusting coil (500) may be dispensed with and may not be an essential element in the exemplary embodiment of the present disclosure.

Meantime, when a current flows in the gap adjusting coil (500) in response to winding to the same direction, an electrostatic force may be generated from the gap adjusting coil (500). A direction of the electrostatic force may be generated from the gap adjusting coil (500) may be determined by a direction of current flowing in the gap adjusting coil (500).

Hereinafter, each side of the gap adjusting coil (500) formed therein with an opening is now defined as first to fourth gap adjusting coil units (510, 520, 530, 540)).

Referring to FIG. 1, the gap adjusting coil (500) may be formed in parallel with XY plane, and a bottom surface of the first magnet (210) may be so arranged as to face an upper surface of the gap adjusting coil (500), and the gap adjusting coil (500) and the first magnet (210) may be spaced apart at a predetermined distance.

The first magnet (210) may be spaced apart from the upper surface of the gap adjusting coil (500) at about 50 μm~300 μm, which is to increase the attractive force and repulsive force in response to the electrostatic force generated from the bap adjusting coil (500) and the magnetic force generated from the magnet (200). Meantime, an inner lateral surface of the shim coil (400) may be arranged at an outside from the peripheral surface of the gap adjusting coil (500) because a bottom surface of the first magnet (210) at the magnet (200) is so arranged as to face the upper surface of the gap adjusting coil (500). The shim coil (400) may be arranged at a direction perpendicular to the gap adjusting coil (500).

Figure 5:
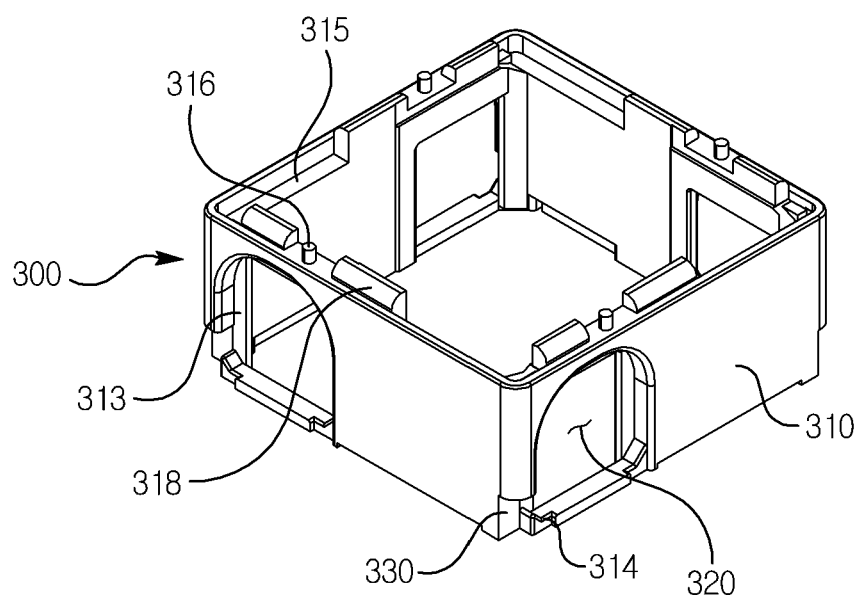
FIG. 5 is a perspective view illustrating a base unit fixing the housing illustrated in FIG. 1.

FIG. 5 is a perspective view illustrating a base unit fixing the housing illustrated in FIG. 1.

Referring to FIGS. 1 and 5, a base unit (600) may function to fix the gap adjusting coil (500), a circuit substrate (discussed later) and the housing (300). The base unit (600) may take a shape similar to a cubic plate. However, the base unit (600) according to an exemplary embodiment of the present disclosure is not limited thereto, and may take various shapes. The base unit (600) may include an opening (610) at a position corresponding to the opening of the carrier (100). The opening (610) of the base unit (600) may take a square shape, for example, but the present disclosure is not limited thereto.

An accommodation groove (620) may be formed along a surrounding of the opening (610) of the base unit (600), where the accommodation groove (620) may be inserted and fixed by the gap adjusting coil (500) of FIG. 2. The thickness of a lens actuator (950) can be reduced as much as the thickness of the gap adjusting coil (500) based on the optical axis of light having passed the lens, as the accommodation groove (620) formed at the base unit (600) is inserted and fixed by the gap adjusting coil (500).

Furthermore, an escape groove (630) may be formed at a position corresponding to the shim coil (400) in the base unit (600) for accommodating a welded portion when the both distal ends of the shim coil (400) and the circuit substrate (described later) are welded. A position corresponding to the bottom surface of the carrier (100) in the base unit (600) may be formed with protruders (640) configured to support the carrier (100). An upper corner of the base unit (600) may be respectively formed with coupling pillars (650), and the coupling pillars (650) may be press-fitted in the coupling grooves (330).

Figure 6:
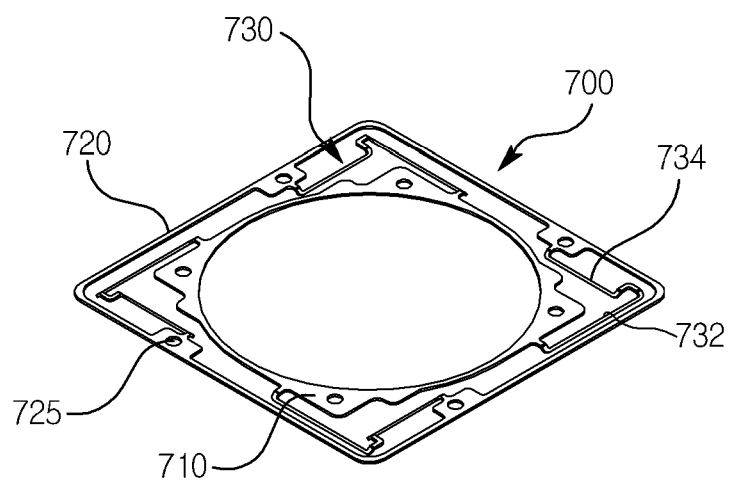
FIG. 6 is a perspective view illustrating an elastic member of FIG. 1.

FIG. 6 is a perspective view illustrating an elastic member of FIG. 1.

Referring to FIGS. 1 and 6, an elastic member (700) may function to elastically fix the carrier (100) to the housing (300). The elastic member (700) may function to restrict a moving length of the carrier (100) spaced apart from the base unit (600) by the magnet (200) and the gap adjusting coil (500), and to move the carrier (100) spaced apart from an upper surface of the base unit (600) to the upper surface of the base unit (600).

Furthermore, the elastic member (700) may also function to return the handshake-corrected carrier (100) while the carrier (100) is shifted by the shim coil (400) and the magnet (200). The elastic member (700) may be respectively arranged at a bottom surface of the carrier (100) arranged in opposition to the base unit (500) and at an upper surface facing the bottom surface. The elastic member (700) may include an inner leaf spring unit (710), an outer leaf spring unit (720) and a connection unit (730).

The inner leaf spring unit (710) may be coupled to a protrude (118) of the carrier (100) at the lens unit (400), and the inner leaf spring unit (710) may be coupled to the carrier (100). The outer leaf spring unit (720) may be arranged at an outer side of the inner leaf spring unit (710) and the outer leaf spring unit (720) may be formed with a through hole (725) coupled to a protruder (316) formed at the housing (300). The connection unit (730) may include a first connection unit (732) and a second connection unit (734).

Although the first connection unit (732) may be connected at one distal end to the inner leaf spring unit (710), and the first connection unit (732) may be formed in a strip shape formed in parallel with the outer leaf spring unit (720), the present disclosure is not limited thereto, and it should be apparent that the first connection unit (732) may be formed with various shapes.

Although the second connection unit (734) may be connected at one distal end to the outer leaf spring unit (720), and the second connection unit (734) may be formed in a strip shape formed in parallel with the outer leaf spring unit (720), the present disclosure is not limited thereto, and it should be apparent that the first connection unit (732) may be formed with various shapes. The first and second connection units (732, 734) are mutually interconnected, whereby the carrier (100) can be shifted to a direction parallel with the gap adjusting coil (500) illustrated in FIG. 2, or can be tilted at a predetermined angle about an optical axis.

Referring to FIG. 1 again, the lens actuator (950) may include a circuit substrate (800) in order to perform the handshake correction function and/or the autofocus function by providing a current to the gap adjusting coil (500) fixed to the base unit (600) and/or to the shim coil (400) fixed to the housing (300).

In the exemplary embodiment of the present disclosure, the circuit substrate (800) may be formed with a partially inner-opened (opening) shape, where the opening may take a shape similar to that of the gap adjusting coil (500).

The gap adjusting coil (500) may be arranged inside the opening of the circuit substrate (800), and the shim coil (400) may be arranged at an upper surface of the circuit substrate (800). Both distal ends of the gap adjusting coil (500) may be electrically connected to a first terminal (810) of the circuit substrate (800), whereby the gap adjusting coil (500) may be provided with a stroke signal configured to move the carrier (100) through the first terminal (810) of the circuit substrate (800).

Both distal ends of each shim coil (400) may be electrically connected to a second terminal (820) of the circuit substrate (800), whereby the shim coil (400) may be provided with a handshake correction signal configured to perform the handshake correction function through the second terminal (820) of the circuit substrate (800).

In the exemplary embodiment of the present disclosure, because the gap adjusting coil (500) is arranged at an inner side of the opening at the circuit substrate (800), the thickness of the lens actuator (950) can be additionally reduced as much as the thickness of the circuit substrate (800).

Referring to FIG. 1 again, the carrier (100), the magnet (200), the housing (300), the shim coil (400), the gap adjusting coil (500) and the elastic member (700) are all arranged inside the cover can (900), where the cover can (900) may be coupled to the base unit (600).

Figure 7:
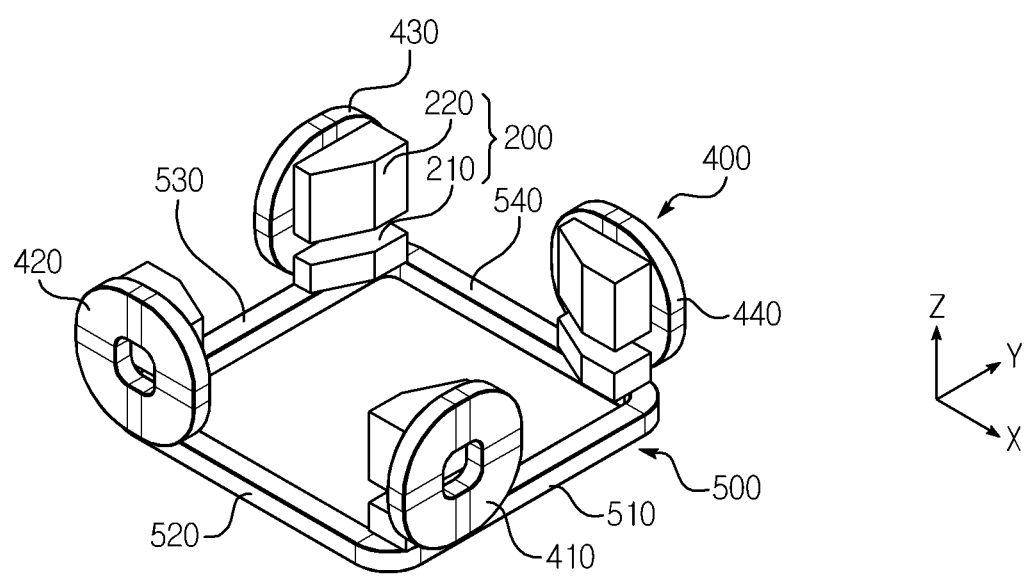
FIG. 7 is a perspective view illustrating a magnet, a shim coil and a gap adjusting coil of FIG. 1.
Figure 8:
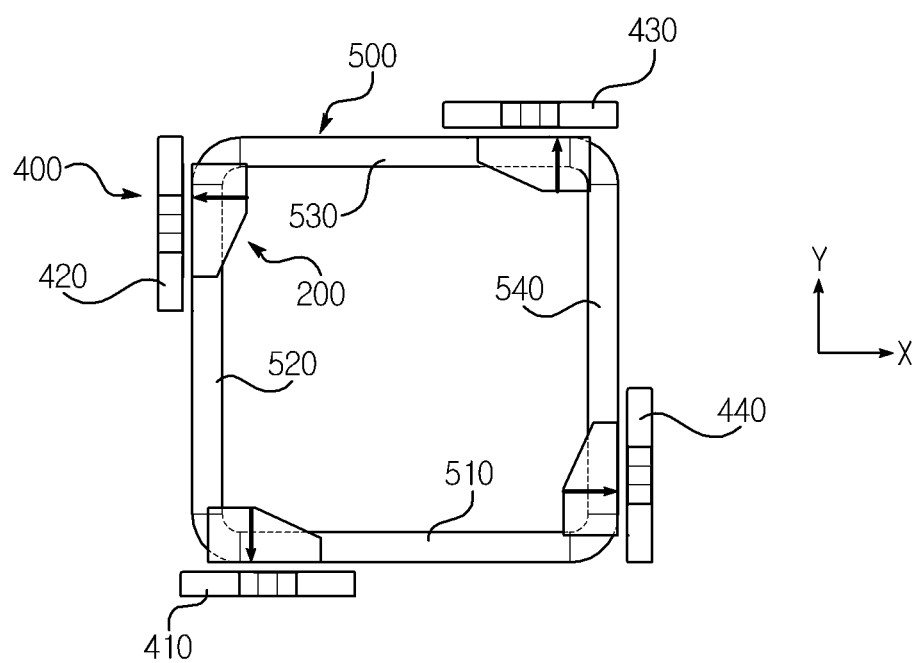
FIG. 8 is a plane view of FIG. 1.
Figure 9:
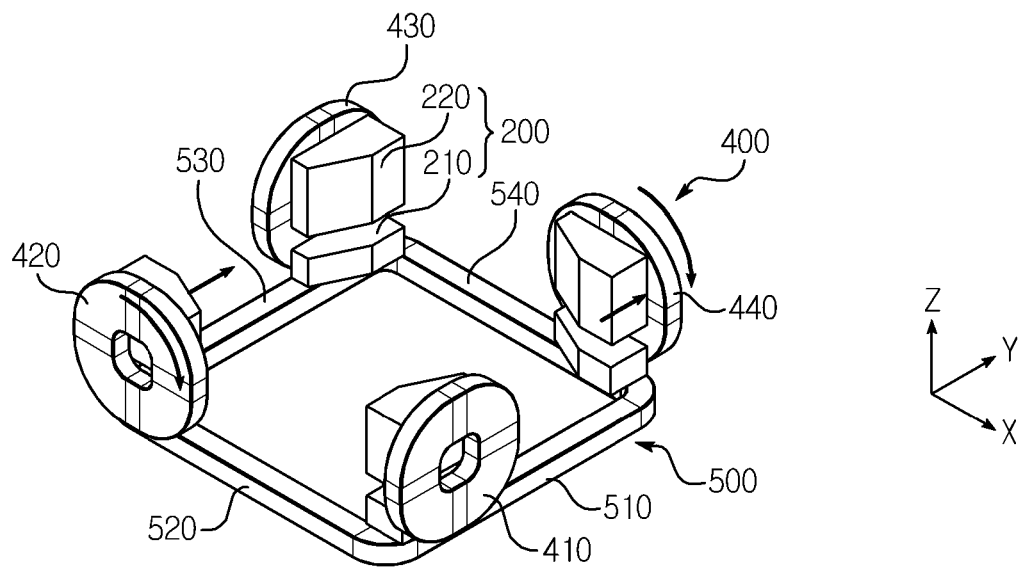
FIGS. 9 to 11 are perspective views illustrating a gap adjusting coil, a shim coil and a magnet illustrated in FIG. 7.
Figure 10:
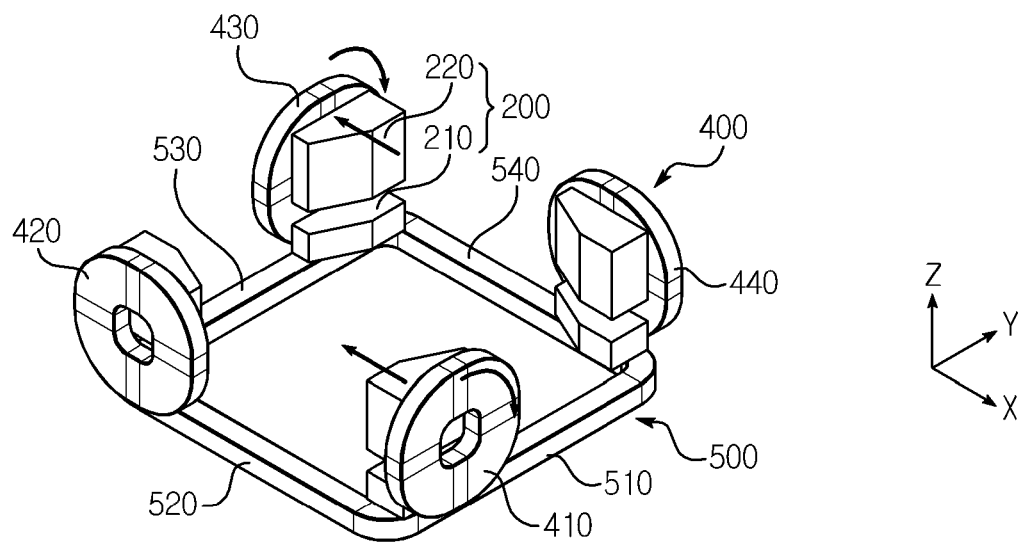
Figure 11:
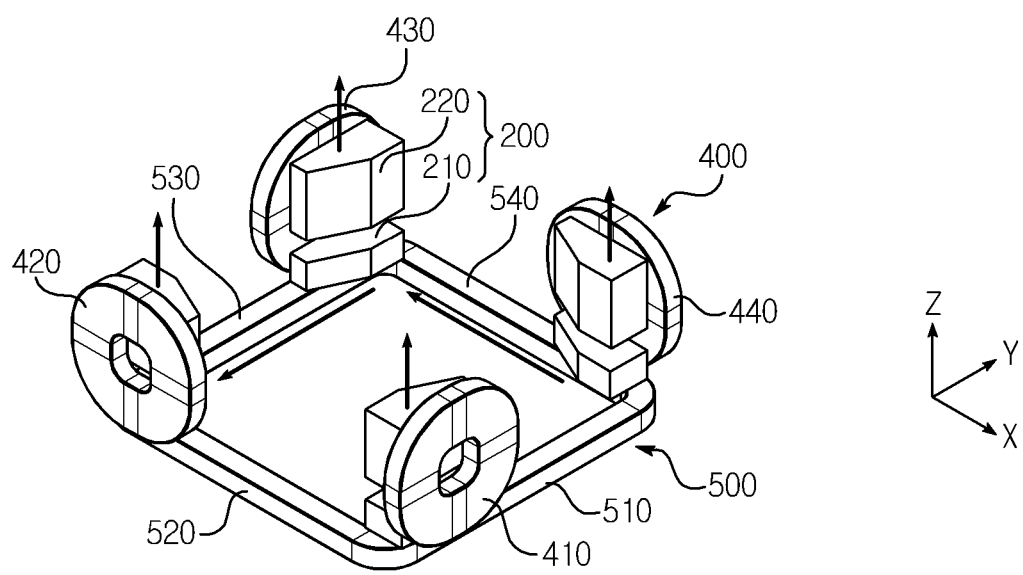

FIG. 7 is a perspective view illustrating a magnet, a shim coil and a gap adjusting coil of FIG. 1. FIG. 8 is a plane view of FIG. 1, and FIGS. 9 to 11 are perspective views illustrating operations of a gap adjusting coil, a shim coil and a magnet illustrated in FIG. 7.

Referring to FIGS. 7 to 11, an electrostatic force is generated by providing a current of same direction to a second correction coil unit (420) and a fourth correction coil (440) in order to perform the handshake correction function by shifting or tilting the carrier (100) mounted with the magnet (200) to Y axis direction perpendicular to an optical axis of light having passed the lens, and the magnet (200) may be shifted or tilted to the Y axis direction in order to offset the handshake using the repulsive force between the electrostatic force generated from the second and fourth correction coil units (420, 440) and the magnetic force generated from the magnet (200). The user's handshake, for example, may be sensed by gyro sensor, but the present disclosure is not limited thereto.

Meantime, an electrostatic force is generated by providing a current of same direction to a first correction coil unit (410) and a third correction coil (430) in order to perform the handshake correction function by shifting or tilting the carrier (100) mounted with the magnet (200) to X axis direction perpendicular to an optical axis of light having passed the lens, and the magnet (200) may be shifted or tilted to the X axis direction in order to offset the handshake using the repulsive force between the electrostatic force generated from the first and third correction coil units (410, 430) and the magnetic force generated from the magnet (200).

Meanwhile, in order to perform the autofocus function by stroking the carrier (100) mounted with the magnet (200) to Z axis direction perpendicular to an optical axis of light having passed the lens, the magnet (200) may be moved to the Z axis direction using the repulsive force between the electrostatic force generated from the gap adjusting coil (500) and the magnetic force generated from the magnet (200).

The lens actuator according to the exemplary embodiments of the present disclosure has an industrial applicability in that magnets are adjacently arranged near a gap adjusting coil for performing an autofocusing function and a shim coil for performing a handshake correction function to allow performing the autofocusing function and the handshake correction function using one magnet, whereby the number of parts, volume and the number of assembly processes can be reduced, and consumption power necessary for performing the autofocusing function and the handshake correction function can be greatly reduced as well.

The previous description of the present disclosure is provided to enable any person skilled in the art to make or use the inventive disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

What is claimed is:

1. A lens actuator, the lens actuator comprising:
a carrier accommodating a lens and formed with a plurality of first lateral surfaces;
a magnet disposed on each of the plurality of first lateral surfaces of the carrier and including a first magnet and a second magnet discretely arranged from the first magnet at an upper side of the first magnet;
a housing disposed outside the carrier and formed with a plurality of second lateral surfaces opposite to the first lateral surfaces;
a plurality of first coils disposed on the housing and formed at a position corresponding to that of the first and second magnets; and
a second coil arranged at a bottom side of each first magnet.

2. The lens actuator of claim 1, wherein the first lateral surfaces of the carrier are formed with first and second reception grooves to accommodate the first and second magnets.

3. The lens actuator of claim 1, wherein a length of the second magnet to an optical axis is longer than that of the first magnet.

4. The lens actuator of claim 1, wherein each first magnet and each second magnet is arranged at a corner portion by being discrete from a center of the first lateral surfaces.

5. The lens actuator of claim 1, wherein the second coil is formed therein with an opening, and formed along an edge of a bottom surface of the carrier.

6. The lens actuator of claim 1, wherein an outside surface of each first magnet and each second magnet is formed with a flat surface, and a part of an inner surface includes a slope.

7. The lens actuator of claim 1, wherein the second lateral surface is formed with a through hole to expose the first coil, and the through hole is formed at a periphery thereof with a breakaway prevention unit to prevent the first coil from breaking away.

8. The lens actuator of claim 1, further comprising a base unit accommodated by the second coil.

9. The lens actuator of claim 8, wherein the base unit is formed with an opening formed at an area corresponding to that of the lens and with a ring-shaped groove arranged at a periphery of the opening to accommodate the second coil.

10. The lens actuator of claim 9, wherein an area corresponding to that of the first coil on an upper surface of the base unit is formed with an escape groove.

11. The lens actuator of claim 1, further comprising a circuit substrate formed with an opening to expose the second coil.

12. The lens actuator of claim 11, wherein the circuit substrate includes a first terminal electrically connected to the second coil and a second terminal electrically connected to the first coil.

13. The lens actuator of claim 1, further comprising a cover can configured to wrap the second coil and the first coil.

14. The lens actuator of claim 1, wherein the second coil is not overlapped with the first coil and the magnet in a direction perpendicular to an optical axis of the lens.

15. A lens actuator, the lens actuator comprising:
a carrier accommodating a lens and formed with a plurality of first lateral surfaces;
a magnet disposed on each of the plurality of first lateral surfaces of the carrier and including a first magnet and a second magnet discretely arranged from the first magnet at an upper side of the first magnet;
a housing formed with a plurality of second lateral surfaces opposite to the first lateral surfaces;
a plurality of shim coils formed at a position corresponding to that of the first and second magnets;
a gap adjusting coil arranged at a bottom portion of the first magnet; and
a leaf spring arranged at an upper surface and a bottom surface of the housing to support an upper surface and a bottom surface of the carrier.

16. The lens actuator of claim 15, wherein a coupling protruder coupled to the leaf spring is formed at the upper surface and the bottom surface of the carrier.

17. The lens actuator of claim 15, wherein the leaf spring includes an inner leaf spring unit coupled to the carrier, an outer leaf spring unit discretely formed from the inner leaf spring unit to be coupled to the housing, and a connection unit connecting the inner leaf spring unit and the outer leaf spring unit.

18. The lens actuator of claim 17, wherein the connection unit includes a straight line-shaped first connection unit connected to the outer leaf spring unit, and a straight line-shaped second connection unit connected to the first connection unit and connected to the inner leaf spring unit.

19. A camera module, the camera module comprising:
an image sensor;
a lens disposed over the image sensor;
a carrier accommodating the lens and formed with a plurality of first lateral surfaces;
a magnet disposed on each of the plurality of first lateral surfaces of the carrier and including a first magnet and a second magnet discretely arranged from the first magnet at an upper side of the first magnet;
a housing disposed outside the carrier and formed with a plurality of second lateral surfaces opposite to the first lateral surfaces;
a plurality of first coils disposed on the housing and formed at a position corresponding to that of the first and second magnets; and
a second coil arranged at a bottom side of each first magnet.

20. A portable device, the portable device comprising:
an image sensor;
a lens disposed over the image sensor;
a carrier accommodating the lens and formed with a plurality of first lateral surfaces;
a magnet disposed on each of the plurality of first lateral surfaces of the carrier and including a first magnet and a second magnet discretely arranged from the first
magnet at an upper side of the first magnet;
a housing disposed outside the carrier and formed with a
plurality of second lateral surfaces opposite to the first
lateral surfaces;
a plurality of first coils disposed on the housing and
formed at a position corresponding to that of the first
and second magnets; and
a second coil arranged at a bottom side of each first
magnet.

* * * * *